$X_C$ = CAPACITANCE PROBE REACTANCE
$X_{XTAL}$ = REACTANCE OF CRYSTAL
$X$ = TOTAL REACTANCE
$Z$ = TOTAL IMPEDANCE

INVENTOR.
SHELBY R. SMITH
BY
ATTORNEY

Dec. 24, 1968  S. R. SMITH  3,418,597
CAPACITIVE MEASURING PROBE AND CIRCUIT THEREFOR
Filed July 13, 1964  2 Sheets-Sheet 2
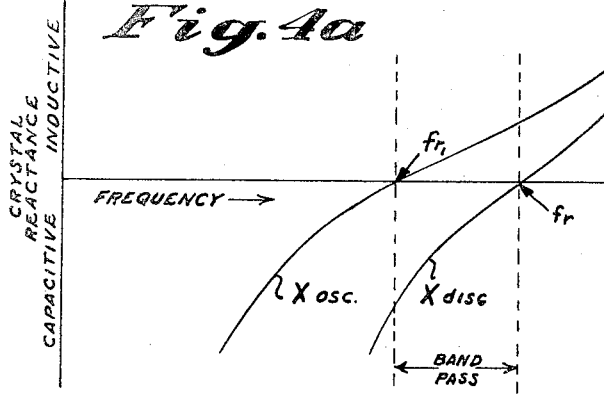
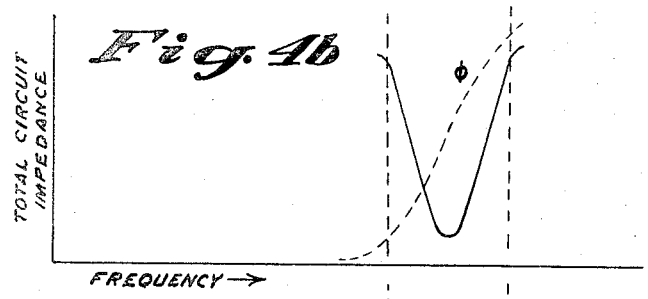
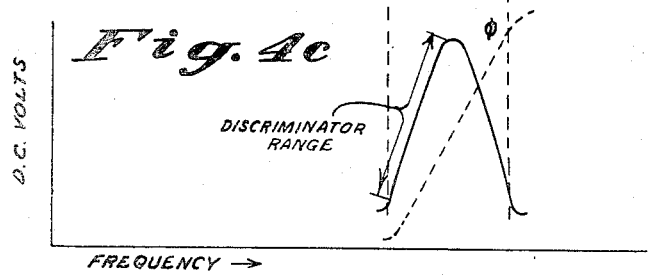
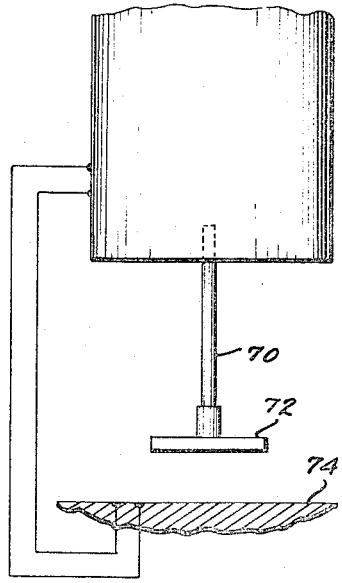
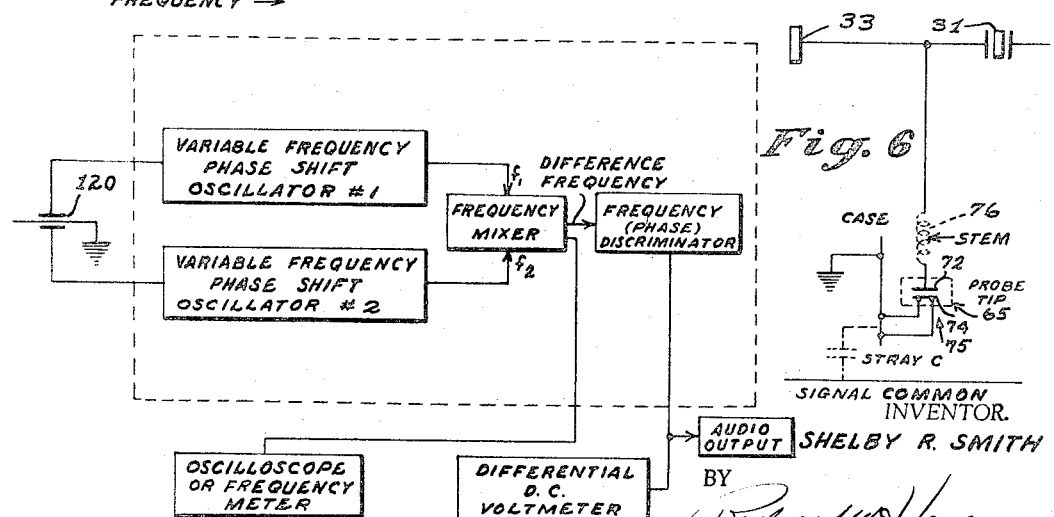
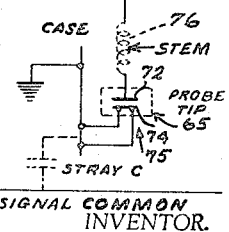
INVENTOR.
SHELBY R. SMITH
BY
ATTORNEY

3,418,597
CAPACITIVE MEASURING PROBE AND CIRCUIT THEREFOR
Shelby R. Smith, 7105 S. Sherman,
Littleton, Colo. 80120
Filed July 13, 1964, Ser. No. 382,061
15 Claims. (Cl. 331—65)

ABSTRACT OF THE DISCLOSURE

The present invention is an oscillator circuit having a regenerative feedback loop including in series a piezoelectric crystal, an emitter follower having an output resistor, an amplifier, and an inductance coupling means. Means in the form of a variable capacitance is connected across the input of the emitter follower to vary the frequency of the oscillator output.

---

The present invention relates generally to apparatus for comparative measurement of material thickness, density of material, distance, level, dielectric constant and others, and more specifically to a variable-frequency oscillator having an externally located variable input capacitance in the form of a measuring probe for inducing changes in the oscillator frequency and resultant meter indications or control action.

Capacitance probes have been employed for some time in the process industry as sensing elements to convert process variables into electrical voltages which are transformed into meter indications or control signals. Such methods are popular because the measurement made with the probe is nondestructive and does not require that electrical elements contacts the substance which is being measured. All such prior art devices, however, suffer from certain disadvantages in stability sensitivity and versatility which it is the primary object of the present invention to overcome.

A second and more specific object of the present invention is to provide a variable-frequency, crystal-controlled oscillator circuit and a capacitance probe which will cooperate to provide the required stability, sensitivity and versatility.

A further object of the present invention is to provide a variable-frequency oscillator circuit in which the effects of various external loads will be minimized.

A still further object of the invention is to provide a variable-frequency oscillator having an extremely sensitive, capacitive input wherein a small change of capacitance will produce a significant change in oscillator frequency.

A still further object of the invention is to provide a capacitance probe which is immune to stray capacitance and stray capacitive effects and wherein the capacitance of the probe is concentrated at the end of the probe tip.

Other and still further objects, features and advantages of the apparatus of the present invention will become clear or will be specifically pointed out in the following description of the preferred embodiment of the present invention taken in conjunction with the accompanying drawings, in which:

FIGURES 4a, 4b and 4c are characteristic reactance, impedance and gain curves respectively, of the discriminator, plotted between the oscillator operating frequency and the upper limit of the oscillator-frequency.

FIGURE 5 is a diagrammatic illustration of the capacitance probe showing the relationship between the effective capacitor plates and the housing case.

FIGURE 6 is a schematic diagram of the probe tip showing the electrical relationship between the stem, capacitor plates and signal and power grounds.

FIGURE 7 is a block of a modified form of the present invention.

Figures 1, 2, 3:
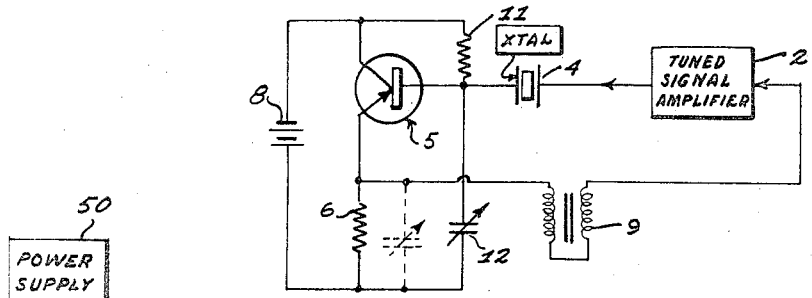
FIGURE 1 is a circuit diagram of an elemental form of the variable-frequency oscillator of the present invention.
FIGURE 2 is a circuit diagram of the preferred form of the oscillator of the present invention shown together with the preferred form of discriminator for direct current output.
FIGURE 3 is a graph plotting impedance and reactance characteristics of a piezoelectric crystal and capacitor versus frequency.

With the foregoing objects in mind, the present invention is carried out by providing an oscillatory loop including a tuned signal amplifier, a piezoelectric crystal, an emitter follower transistor circuit, or its equivalent, having an output resistor, and an inductive coupling means all connected in a series relationship to form a loop. To change the frequency of the oscillations produced, means forming a phase shift network including a variable capacitor are connected across the circuit elements of the emitter follower.

Preferrably a transistor circuit forms the signal amplifier for which a tuned tank circuit provides the load and to which the frequency controlling crystal couples the base of a second feedback transistor which may be the emitter follower. In such an arrangement the feedback loop is completed by an inductive coupling from the emitter of the feedback transistor to the base of the signal amplifier. The variable capacitor may take a variety of physical forms but in essence includes means forming the plates of a capacitor which may be sized and positioned to move with respect to one another or to accept therebetween materials and substances of varying dielectric properties which, in either case, result in changing the electrical capacitance of the plate forming means so as to effectuate a change in oscillator frequency which is made meaningful by the D.C. output of a frequency discriminator connected to the oscillator output or by a frequency counter fed by the amplifier output of the oscillator.

The basic form of variable-frequency oscillator according to the present invention is indicated generally in FIGURE 1. As is characteristic of all series oscillators, a series loop is provided having a gain greater than unity and in which the phase of oscillations is shifted 360°, or multiple thereof, around the loop so that feeble starting voltages may be reinforced to develop a usable output and may be made continuous and self sustaining. The oscillatory loop comprises a tuned signal amplifier circuit 2, whose output is fed to a piezoelectric crystal 4, operating in the series mode. The other crystal terminal is connected to the base of a transistor 5 operating as an emitter follower with a load resistor 6 in the emitter circuit and with appropriate biasing supply voltage supplied by a D.C. source 8. The emitter follower output is inductively coupled by a transformer 9 to the input of the signal amplifier, thus forming a closed oscillatory loop. Linearly changing the frequency of the voltage produced in the loop is a function of the novel arrangement provided by the present invention in the form of a phase shift network including a resistor 11 and variable capacitor 12 connected across the circuit elements of the emitter follower. Specifically, the resistor is connected from the base to the collector of the transistor 5 and the variable capacitor may be connected across the input, that is between the base and connon signal point, or alternatively across the follower load resistor 6 as shown in dotted lines in FIGURE 1.

Although the circuit just described illustrates the novel frequency changing arrangement, the present invention contemplates certain other novel modifications and additions to this elemental form made necessary in order to overcome certain practical problems, such as producing a usable output without disturbing the functioning of the oscillator, compensating for temperature fluctuations, making the oscillator stable, and producing means forming a sensitive input capacitance suitable for making accurate measurements, all of which are objectives and features of the invention as a whole.

FIGURE 2 illustrates a more practical form of circuitry comprising the concept of the present invention. The regenerative oscillatory loop in this preferred embodiment comprises a current amplifier circuit, including a transistor 20 connected in the common emitter configuration, and a tuned parallel tank load circuit 22 which includes a capacitor 25 and an inductance 27. A low impedance tap is provided on the inductance 27 which is connected to one terminal of a piezoelectric crystal 31. The other terminal of the crystal is attached to the base 33 of transistor 35 connected as an emitter follower and having a load resistor 39. In parallel with the load resistor 39 is the combination of a current limiting resistor 40 in series with the primary 43 of a one-to-one coupling transformer 41. One terminal of the secondary 45 of the transformer is connected through a phase shift capacitor 46 to the base element of the current amplifier transistor 20 and the other terminal to the junction of the primary winding 43 and the current limiting resistor 40, thus completing the loop.

To encourage oscillations in the regenerative loop just described, the tank circuit 22 is turned to antiresonance at the fundamental crystal frequency or a harmonic thereof, depending on the chosen frequency of oscillation. Because piezoelectric crystals display minimum impedance at their resonant frequency or harmonic thereof the frequency of oscillation will correspond to that frequency. However, due to the addition of the novel structure of the present invention the oscillator can be made to oscillate at any frequency within a specified range below the resonant crystal frequency.

Referring to the curves of FIGURE 3, the crystal reactance curve is indicated $X_{xtal}$ and the crystal impedance curve as Z, indicating zero reactance and minimum impedance at the resonant crystal frequency $f_r$. The crystal reactance curve $X_{xtal}$, when algebraically added to the capacitive reactance curve $X_c$ of a variable capacitance 65, connected across the input of the emitter follower 35, provides an explanation of the change in oscillator frequency with the change in capacitance. (The capacitor may be connected across the load resistor 39 but requires a larger capacitance to achieve the same effect.) It is apparent that as the curves are added to produce curve X, the point of crystal resonance changes to the left in the graph and the oscillating frequency is lowered to $f_{r1}$. Another explanation of the same phenomenon is that the capacitor 65 and a resistor 56 act as a phase shifting network attached to and influential on the regenerative loop and as the capacitor 65 is changed in value the phase shift around the loop is modified to the extent that the minimum crystal impedance occurs at a lower frequency to which the loop oscillations immediately change. Regardless of the theoretical explanation of the circuit behavior, a substantial frequency change may be effectuated in the oscillator by changing the value of the capacitor 65.

An additional feature of the invention is the discovery that with certain modifications from the standard component design, the capacitor 65 may take the form of a capacitance probe which is advantageously used as a measuring device. One embodiment of the probe is disclosed in FIGURE 5 where a stem 70 of magnetic material is electrically connected by a wire or other suitable means to the base of the follower transistor 35. A plate 72 of conducting material and of a size depending on the capacitance desired is attached to the tip and forms one plate of the capacitor 65. In operation the plate 72 is positioned parallel to a second conducting plate 74, which forms the second plate of the capacitor 65. The substance to be measured is placed between the plates 72 and 74. As is well known in the electronic art capacitance is a function of dielectric constant, plate interspacing and dielectric thickness, in addition to other variables, and it will be obvious that as varying substances are placed between the plates of the capacitance probe 65 the capacitance thereof will vary, thus changing the frequency of the oscillator.

The probe stem 70 is, for most purposes, constructed of magnetic material which appears as an inductance 76 in an equivalent circuit of the probe, as seen in FIGURE 6. Such construction has the advantage of concentrating the capacitance in the tip of the probe where it can most effectively be used in making measurements. A further objective of an effective probe of the type described and one which is satisfied by the present invention is the elimination of stray capacitance effects produced by objects which may be close to the probe and by other elements of the circuit such as cables, chassis, etc. It has been found that the use of a double cable 75 or two wire connection, from the second plate 74 to the case ground 78 is unusually effective in shorting the unwanted inductance in a single wire connection and also eliminates the stray capacitance associated with such a conductor. To isolate the signal common and the power ground point the chassis or case is preferably kept apart from the signal common and is electrically connected therewith only through the stray capacitance existing between these elements, all of which is illustrated in FIGURE 6. Although a magnetic probe stem has been discussed there are instances where a nonmagnetic stem may be necessary or desirable and such a stem may certainly be employed without departing from the scope of the invention. It is also to be understood that the effective plates 72 and 74 of the capacitor may be either magnetic or nonmagnetic material depending on the requirements of the specific use or application. So too can the plates be formed in other shapes such as telescoping coaxial rods electrically insulated one from the other.

Although a load can be connected directly across the follower load resistor 6 in the simplified form of circuit shown in FIGURE 1, a more practical method of using the circuit output is indicated in the circuit of FIGURE 2. In this arrangement the emitter follower 35 is electrically tied to a third circuit transistor 82 in such a manner as to form a common-collector common-base pair, useful to provide current isolation in the oscillator and matching of the low impedance of the follower circuit to the high impedance of subsequent stages. The output of the said common-collector common-base pair is taken from the high impedance end of tuned tank circuit 83 in the output circuit of the transistor 82 and connected to a second common-collector common-base pair of transistors 86 and 87 which also functions to further the current isolation of the oscillator and as further impedance matching for the gain stages next following and referred to generally in the circuit diagram as a block 88. The circuitry represented by the block 88 is well known in the electronic art and comprises any desired number of amplification and load isolation stages, depending of course upon the intended function of the output signal. One use can be that of feeding a frequency counter.

Use of the instrument of the present invention has indicated that a D.C. differential voltmeter as the ultimate output has wide appeal. With such an instrument unknowns are compared with knowns or standards and by a nulling process the voltmeter may be read to provide an unexpectedly high degree of resolution on the order of .000010 inch when measuring thickness of material.

To achieve this resolution a still further feature of the invention is found in the discriminator circuit, generally referred to by reference numeral 90. The discriminator comprises a four-legged full-wave rectifier bridge having load resistors 91 and 92 across the diagonal corners thereof. Connected in parallel with two of the bridge rectifiers 94 and 95 are a piezoelectric crystal 97 and a variable capacitor 98 respectively. To explain the action of the discriminator, reference is made to the graphs of FIGURES 4*a*, 4*b* and 4*c*. Assuming that the crystal 31 in the oscillator circuit and the discriminator crystal 97 are of the same resonant frequency the reactance curves of the two crystals plotted on the same axis would appear as shown in FIGURE 4*a*. The oscillator crystal curve $X_{osc}$ is displaced to the left of the discriminator crystal curve $X_{disc}$ because of the influence of the capacitance probe 65 or 65*a* in the oscillator circuit, as explained in connection with the graph of FIGURE 3. If the curves $X_{osc}$ and $X_{disc}$ are algebraically added a total impedance curve for the instrument is obtained as shown in FIGURE 4*b*. In FIGURE 4*c* the inverse of the impedance curve is plotted as gain or D.C. voltage, versus frequency, illustrating the substantially linear relationship between oscillator frequency change and D.C. voltage output.

Preferably a constant D.C. load circuit 96 is connected to the discriminator so that the load changes made by the differential voltmeter will be small compared to the normal load.

To further protect the instrument against the effects of power supply capacitance and phase shift, an isolation transistor 101 is connected in the common base configuration in the D.C. supply line and the electrical power ground is run with two wires 102 and 103 to reduce stray capacitance and inductance.

A modified form of the invention is shown in FIGURE 7. The primary purpose of the alternative form is to increase the effective temperature compensation of the instrument. In addition to being placed in a controlled temperature environment the preferred form of FIGURE 2 is provided with a temperature compensating feedback path 69 from the signal amplifier circuit to the base of the emitter follower transistor 82, however for extremely accurate measurements this compensation is not sufficient to eliminate absolutely all fluctuations due to temperature variation. In the modified form a differential capacitance probe 120, having a grounded center plate, is employed to change the frequency of two similar oscillator circuits of the type shown and described in FIGURE 2. The outputs of the oscillator are mixed to provide a difference frequency which is employed to produce a meter indication as already explained. If the oscillators are placed in the same thermal package changes in temperature will have no effect on the difference frequency.

Having thus described the several useful and novel features of the capacitive measuring probe and circuit therefor of the present invention in connection with the accompanying drawings, it will be seen that the many worthwhile objectives for which it was designed have been achieved. Although but a few of the several possible embodiments of the invention have been illustrated and described herein, I realize that certain additional modification may well occur to those skilled in the art within the broad teaching hereof; hence it is my intention that the scope of protection afforded hereby shall be limited only insofar as said limitations are expressly set forth in the appended claims.

I claim:

1. A variable-frequency, crystal-controlled oscillator including:
    a signal amplifier having input and output elements including a tuned output tank circuit;
    a feedback loop comprising:
        a piezoelectric crystal electrically connected to the tank circuit;
        an emitter follower transistor circuit having an input including the base at the transistor and a common signal point and an output resistor and connected to the said crystal at the base of the said transistor;
        inductance means coupling the output of the said emitter follower to the input element of the signal amplifier; and
        means forming a variable capacitance and having an effective pair of plates conected across said emitter follower input.

2. The circuit of claim 1 wherein the variable capacitance means includes:
    a stem of magnetic material;
    a flat plate member of electrically conductive material connected to one end of said stem, said plate member forming a first plate of an electrical capacitor; and
    means forming a second capacitor plate and spaced apart from said first plate.

3. The circuit of claim 1 wherein the variable capacitance means includes:
    a stem of nonmagnetic material;
    a flat plate member of electrically conductive material connected to one end of said stem, said plate member forming a first plate of an electrical capacitor;
    means forming a second capacitor plate and spaced apart from said first plate; and
    means electrically connecting the said first and second plates across the output resistor of the emitter follower.

4. The combination of claim 2 and further including:
    a conductive case surrounding said circuit; and
    a pair of conductors electrically connecting the said second capacitor plate to the said case.

5. A variable-frequency, crystal-controlled oscillator including:
    a signal amplifier having input and output elements including a tuned output tank circuit;
    a feedback loop comprising;
        a piezoelectric crystal electrically connected to the tank circuit;
        an emitter follower transistor circuit having an output resistor and connected to the said crystal at the base of the said transistor;
        inductance means coupling the output of the said emitter follower to the input element of the signal amplifier; and
    means forming a variable capacitance and having an effective pair of plates connected across the output resistor of the said emitter follower circuit.

6. A variable-frequency crystal-controlled oscillator having:
    a regenerative feedback loop comprising:
        a tuned signal amplifier;
        a piezoelectric crystal;
        emitter follower means including a transistor emitter and an output resistor interconnecting the the said emitter and a common signal point;
        inductance coupling means;
        means connecting the said amplifier, crystal, emitter follower and inductance in series to form an oscillatory loop; and
        phase shift means including a variable capacitance connected across the input of the said emitter follower.

7. The combination of claim 6 wherein the said variable capacitance comprises:
    a pair of conductive members disposed in spaced apart relationship;
    an elongated conductive stem attached to one of said plates and electrically connected to the base of the said emitter follower transistor; and
    further including means electrically coupling the second one of said plates to the said common signal point.

8. A variable-frequency crystal-controlled oscillator having:
    a regenerative feedback loop comprising;
        a tuned signal amplifier;
        a piezoelectric crystal;

emitter follower means including a transistor and an output resistor interconnecting the said emitter and a common signal point;
inductance coupling means;
means connecting the said amplifier, crystal, emitter follower and inductance elements in series to form an oscillatory loop; and
phase shift means including a variable capacitance connected across the output resistor of the emitter follower.

9. A capacitance sensitive electronic measuring instrument comprising in combination:
a conductive housing;
an oscillator mounted in said housing and having:
an output;
a regenerative feedback loop including a piezoelectric crystal; and
at least one capacitance means connected to said loop and having a conductive stem and at least two effective capacitor plates mounted outside of the housing, one of said plates being mounted on the stem; and
a pair of conductors, said conductors connected in electrical parallel from a second one of the capacitor plates to the housing; and
a frequency discriminator circuit coupled to the output of the oscillator.

10. The combination of claim 9 wherein the discriminator circuit comprises:
a full-wave rectifier bridge circuit having a piezoelectric crystal connected in parallel with one of said rectifiers and a variable capacitor connected in parallel with a second one of said rectifiers.

11. A capacitance sensitive electronic measuring instrument, comprising in combination:
a conductive housing;
means forming a variable frequency oscillator mounted in said housing and including:
a regenerative feedback loop having:
a piezoelectric crystal,
emitter follower means having an input and an output circuit means,
amplifier means,
means coupling the output of said emitter follower to the amplifier means,
means operatively interconnecting the said loop elements to form a loop, and
capacitance means disposed externally of the housing and electrically connnected across the input of the said emitter follower.

12. The combination of claim 11 and further including:
a frequency discriminator having a D.C. output which is a function of frequency, said discrminator being connected to the said output circuit means.

13. The combination of claim 12 wherein said capacitance means includes:
a conductive stem;
a first conductive plate mounted on the end of said stem;
a second conductive plate spaced apart from said first plate, and further including;
a pair of conductors connecting said second plate to said housing.

14. In a measuring instrument a frequency discriminator comprising:
a full-wave bridge rectifier having output terminals and four high frequency diodes;
a piezoelectric crystal connected in parallel across one of said diodes;
a variable capacitor connected in parallel across a second one of said diodes; and
load means connected across the bridge output terminals.

15. A capacitance sensitive device including:
a differential capacitor means forming at least two interrelated variable capacitors;
a pair of variable frequency oscillators having inputs connected respectively to the said two variable capacitors wherein at least one of the said oscillators comprise:
a signal amplifier having input and output elements including a tuned output tank circuit;
a feedback loop comprising:
a piezoelectric crystal electrically connected to the tank circuit,
an emitter follower circuit including a transistor having a base, an output resistor, and means interconnecting the said crystal and the base of the transistor,
inductance means coupling the output of the said emitter follower to the input element of the signal amplifier;
wherein one of said variable capacitors is connected across said emitter follower input;
a frequency mixer circuit connected to the outputs of the said two oscillators; and
a frequency discriminator connected to the output of the frequency mixer.

References Cited

UNITED STATES PATENTS

| | | | |
|---|---|---|---|
| 2,240,452 | 4/1941 | Wolfskill | 331—37 |
| 3,227,968 | 1/1966 | Brounley | 331—116 X |
| 3,234,460 | 2/1966 | Baird | 324—61 |
| 3,260,960 | 7/1966 | Bangert | 331—65 |
| 3,303,436 | 2/1967 | Krausz | 331—116 |

FOREIGN PATENTS 823,819  11/1959  Great Britain.

JOHN S. HEYMAN, Primary Examiner.

U.S. Cl. X.R.

331—116, 177; 328—5; 307—233, 295